United States Patent [19]

Stanley

[11] 3,897,034

[45] July 29, 1975

[54] ROCKET ACTUATION DEVICE

[75] Inventor: Robert M. Stanley, Denver, Colo.

[73] Assignee: Stanley Aviation Corporation, Denver, Colo.

[22] Filed: Oct. 15, 1973

[21] Appl. No.: 406,197

[52] U.S. Cl. .......................................... 244/122 AD
[51] Int. Cl. .............................................. B64d 25/10
[58] Field of Search ......... 89/1.8, 1.818; 244/122 R; 102/49.7, 81.6

[56] References Cited
UNITED STATES PATENTS

| | | | |
|---|---|---|---|
| 2,692,557 | 10/1954 | Wales, Jr. ...................... | 102/81.6 X |
| 3,111,927 | 11/1963 | Temple et al. ..................... | 89/1 X |
| 3,442,473 | 5/1969 | Rivedal et al. ..................... | 89/1.818 |

*Primary Examiner*—Stephen C. Bentley
*Attorney, Agent, or Firm*—Sheridan, Ross & Fields

[57] ABSTRACT

An actuation device is provided for a rocket used to pull a tow line attached to an object. The rocket is launched prior to ignition so that its tow line is pulled taut, prior to its application of a predetermined snubbing force on the tow line which then shears a pin, whereupon the tow line yanks a conical shaped collar to actuate one or more firing pin bolts which in turn cause the firing pins to strike percussion caps and ignite the rocket which then pulls the tow line and attached object. A safety ring can be installed on the rocket to prevent accidental movement of the sliding bolts which could inadvertently ignite the rocket.

11 Claims, 6 Drawing Figures

PATENTED JUL29 1975    3,897,034

SHEET 1

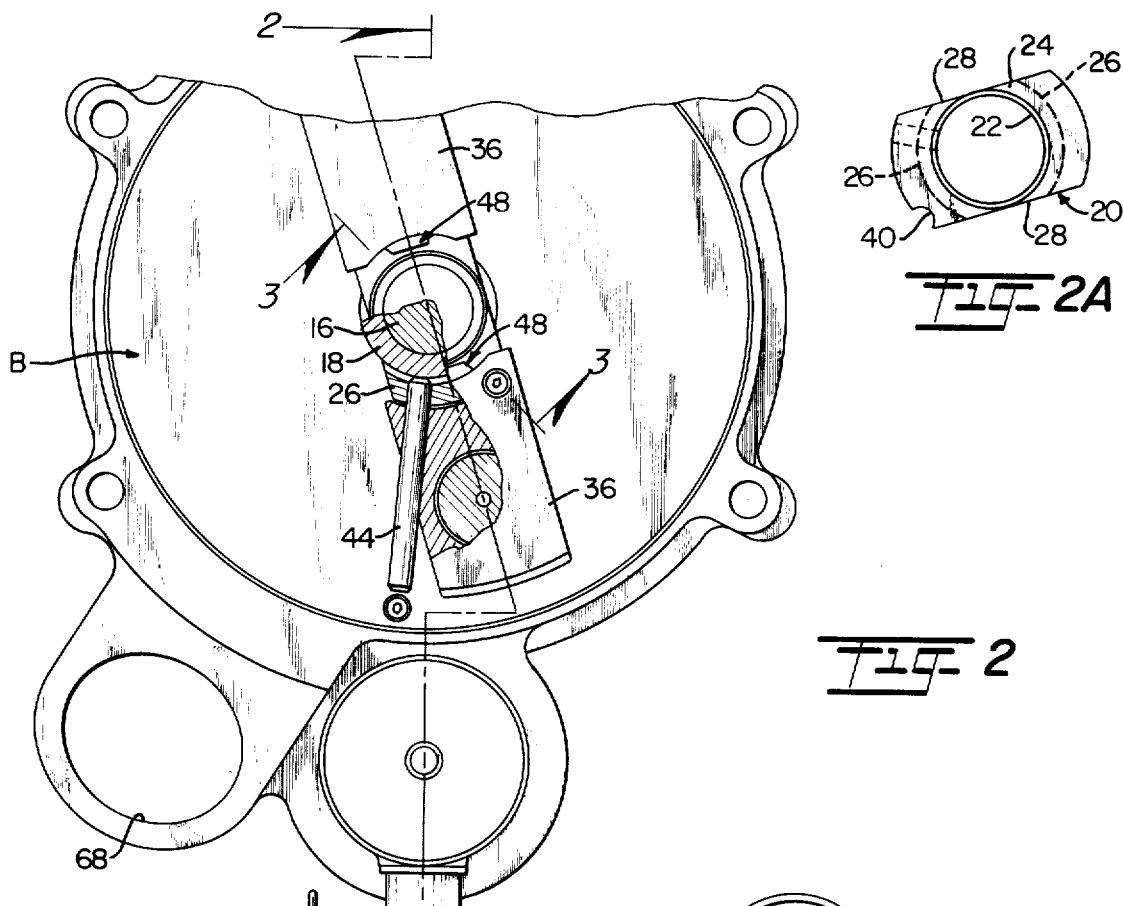
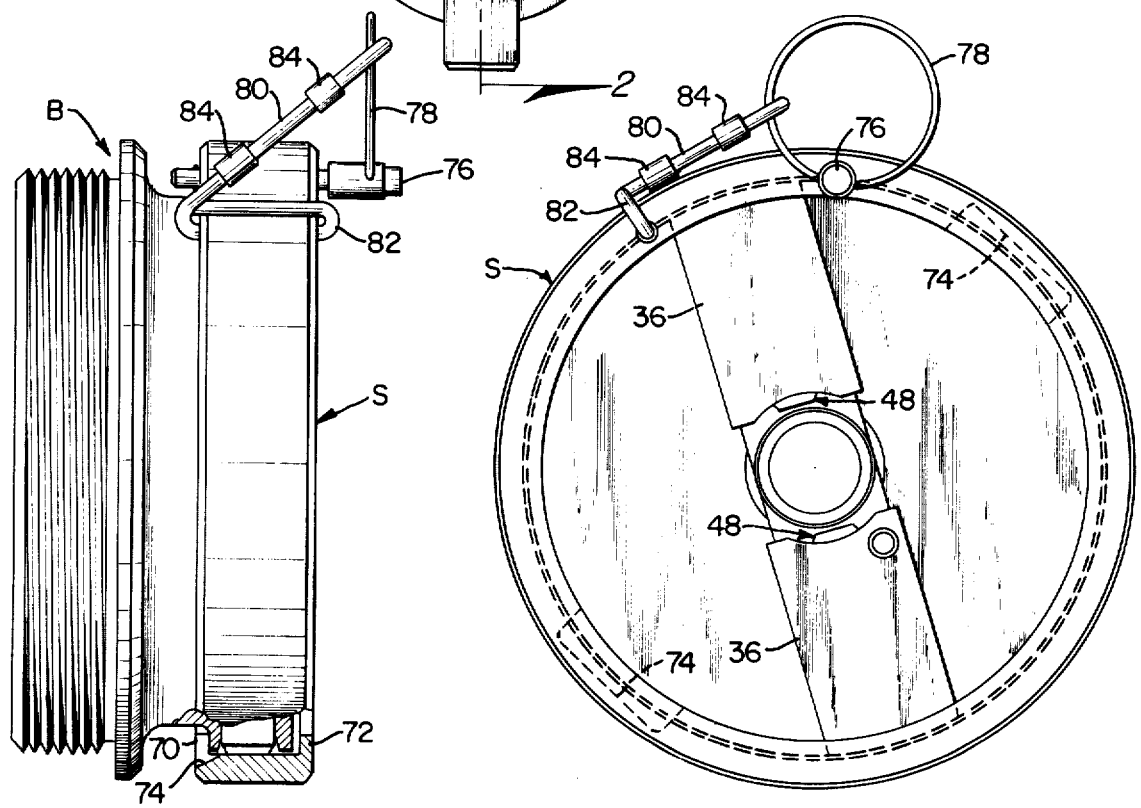

ROCKET ACTUATION DEVICE

BACKGROUND OF THE INVENTION

1. Field of the Invention

The invention relates to a rocket actuation device and, more particularly, to a rocket actuation device for a rocket used to pull an object by a tow line.

2. Description of the Prior Art

Various types of devices for extracting an object from a vehicle with a tractor rocket have been devised. One such device is disclosed in commonly assigned U.S. Pat. No. 3,355,127 which issued on Nov. 28, 1967, and U.S. Pat. No. 3,424,409 which issued on Jan. 28, 1969. This device provides an illustration of one application only in which the present invention can be used. In accordance with those patents, a rocket is located in a cockpit of an aircraft to the rear of the pilot's seat for catapulting through an opening provided by removal of a canopy prior to ejection.

The rocket is launched to the length of its tow line by means of a rocket catapult using cartridge-provided expanding gases as illustrated in FIG. 9 of those patents. A pendant or tow line, attached between the rocket and the towed object, will be pulled taut as the rocket moves away from the catapult, the upper end of the pendant being attached to a firing mechanism for igniting the rocket. When a predetermined force level has been reached due to the stretching of the pendant between the rocket and the towed object, the rocket's firing mechanism is activated to ignite the rocket which pulls the towed object.

The tractor rocket described under U.S. Pats. Nos. 3,355,127 and 3,424,409 operates very satisfactorily, but has a disadvantage in that the firing mechanism for the rocket is of considerable length. This length is required to permit longitudinal retraction of the firing pin against the force of a coil spring before the firing pin is released to ignite the rocket. This structure unnecessarily increases the length of the rocket and, therefore, the space required for its deployment.

The invention is particularly useful in rocket application wherein swiveling is unnecessary and requires much less longitudinal space than the swivel bearing construction required for swiveling.

SUMMARY OF THE INVENTION

In accordance with this invention, a rocket actuation device of compact size is provided wherein a sliding bolt or sear is activated when the force on a pendant attached to the rocket exceeds a certain amount so that the bolt is moved laterally along a path perpendicular to the axis of the rocket by a camming action to cause a firing pin to engage a percussion cap or other ignition device with sufficient force to ignite the rocket.

More particularly, the sliding bolt or sear is activated upon the fracturing of a shear pin when the force on the pendant exceeds a predetermined level to cause a conical member whose surface engages a cam surface on the bolt to be jerked longitudinally a short distance so that a second camming surface thereon urges the firing pin into the percussion cap with sufficient force to ignite the rocket. Conveniently, a safety ring is provided which can be placed around the base of the rocket to preclude any accidental or inadvertent movement of the sear prior to its intentional ignition.

From the foregoing, it can be seen that a highly efficient rocket actuation device has been provided which takes up relatively little space at the end of the rocket so that space requirements are minimized. This is accomplished by converting a short longitudinal motion into a lateral motion through a camming action to ignite the rocket. Furthermore, a safety ring is provided which will prevent movement of the sear or firing pin actuation bolts to prevent inadvertent or premature firing of the rocket.

Additional advantages of the invention will become apparent from the description which follows, taken in conjunction with the accompanying drawings.

BRIEF DESCRIPTION OF THE DRAWINGS

FIG. 2 is a fragmentary bottom plan view of a rocket with parts broken away to show details of the shear pin which is fractured by a predetermined force being applied to the pendant;

FIG. 2-A is bottom view of a firing sear ramp for the rocket of FIG. 1;

FIG. 4 is a bottom plan view of the rocket showing a safety ring attached thereto to prevent inadvertent ignition of the rocket; and FIG. 5 is a side elevation of the safety ring of FIG. 4 showing its attachment to the base of the rocket and having parts broken away for clarity of illustration.

DESCRIPTION OF THE PREFERRED EMBODIMENT

Figure 1:
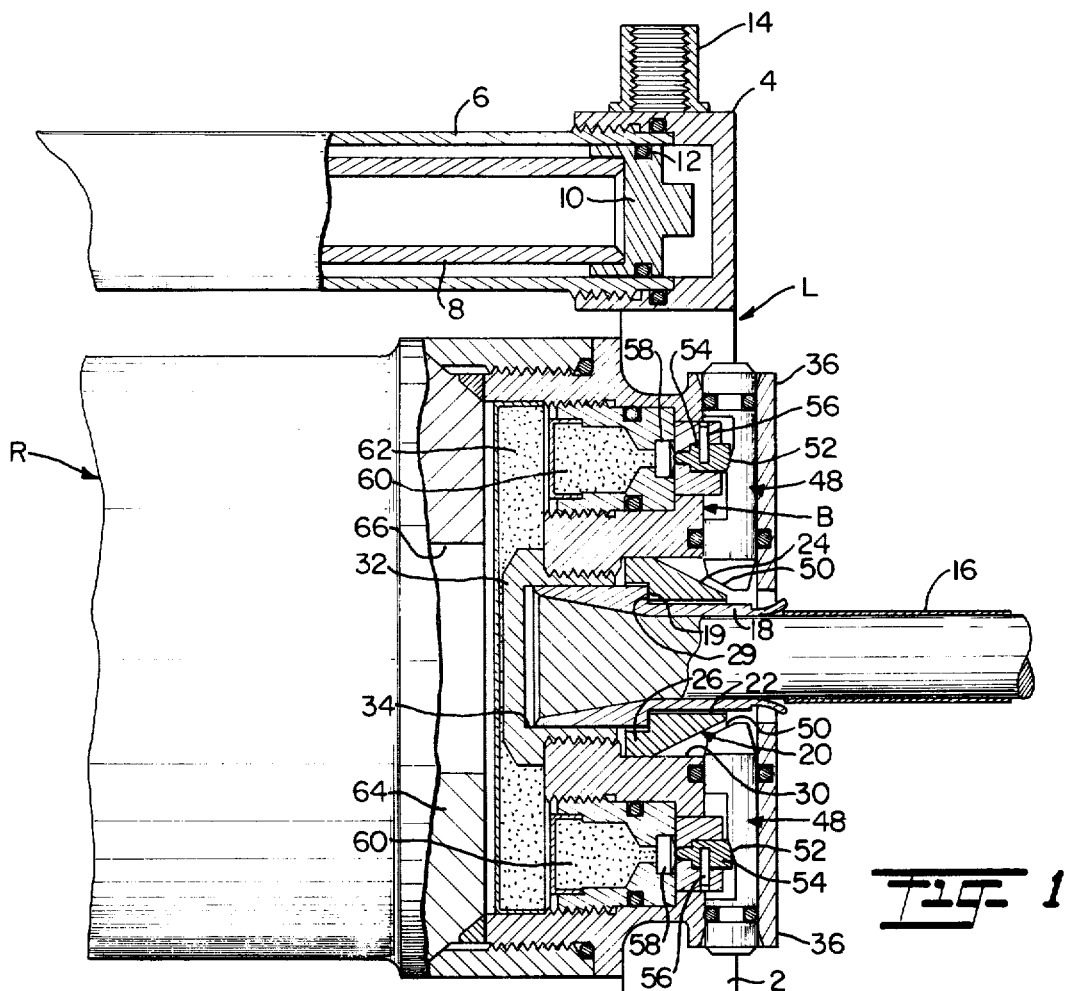
FIG. 1 is a fragmentary side elevation of a rocket with parts broken away to show details of the activation device for igniting the rocket.

In accordance with this invention, a rocket actuation device is provided which is an improvement of that disclosed in commonly assigned U.S. Pat. Nos. 3,355,127 and 3,424,409, previously discussed. The disclosure of those patents is incorporated by reference herein. Conveniently, a rocket R is mounted on a rocket catapult L, as illustrated in FIG. 1, which includes an annular portion having a circular opening 2 for receiving a base B of the rocket. The rocket catapult also includes spaced internally threaded cups 4 for receiving hollow pipe 6, respectively, which serve as expansion chambers during launching of the rocket. A piston rod 8 extends within each of expansion tubes 6 and is attached to the upper end of the rocket (not shown), and a lower end has a piston 10 attached thereto carrying an annular O-ring 12 to prevent the escape of gases between the piston 10 and the wall of tube 6. When the user activates the system, a propulsive charge, not shown, is ignited causing compressed gases to rush through ports 14 and into the space between each piston 12 and the bottom of each cup 4 whereby the expansion of the gases forces pistons 10 upwardly and, hence, launches the rocket. Conveniently, shear bolts, not shown, hold the rocket R on catapult L until sufficient force is built up between piston 10 and cup 4 for rapid acceleration to launch the rocket.

The assembly for igniting the rocket propellant to actuate the rocket upon the pendant 16 being pulled taut when the rocket is catapulted will now be described along with its operation. The pendant 16 must be of elastic or resilient material, preferably nylon, as this resiliency is essential to the operation of the firing mechanism as will be explained. A metal sleeve 18 is secured by resin or other suitable material to the end of the pendant attached to the rocket. The metal sleeve 18 has a circumferential step 19 in its outer surface which in assembly cooperates with a slidable camming means, such as hollow firing sear ramp 20, fitting over sleeve 18 and provided with an internal step mating with external step 19 of sleeve 18. The sear ramp serves the dual function of locking the pendant and sleeve assembly in the rocket base and of actuating firing pin sears when the pendant moves it rearwardly upon being pulled taut. Ramp 20 has an axial opening 22 and camming surfaces 24 which are segments of a cone and terminate in depending flanges 26. As seen in FIG. 2-A, firing sear ramp 20 has straight parallel sides 28 which facilitate assembly of the pendant on the rocket as described below. Furthermore, parallel sides 28 join arcuate end portions at flanges 26 to define a generally rectangular surface 29 for supporting sleeve 18 at circular flange 19.

The base B of the rocket includes a central recess 30 for receiving a recessed threadably attached end cap 32, the assembly of the end of pendant 16, sleeve 18 and sear ramp 20 fitting in the recesses. The end cap 32 includes a socket for receiving the end of pendant 16 with the sleeve 18 attached. Generally, rectangular housings 36 extend laterally outwardly on opposite sides of central opening 22 and each enclose a rocket ignition device to provide a redundant system.

Figure 3:
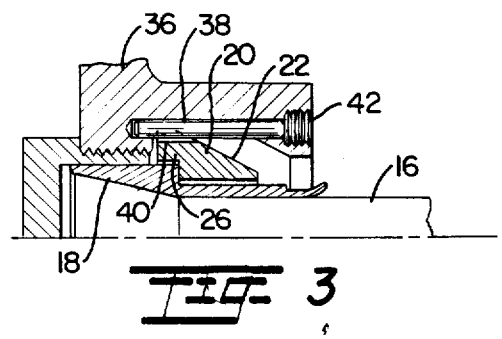
FIG. 3 is a vertical section taken along line 3—3 of FIG. 2 showing a locating pin for holding the sear ramp and pendant in attached position.

To attach pendant 16 to rocket R for final assembly, firing sear ramp 20 positioned over sleeve 24 is oriented, as shown in FIG. 2-A, with respect to base B, as shown in FIG. 2, so that it can be inserted between the internal ends of housings 36, after which it is rotated 90° to the position shown in FIG. 2 to lock the assembly of pendant end, attached sleeve 18 and sear ramp 24 in the recess 30 of rocket base B. As seen in FIG. 3, the sear ramps are held in proper locking orientation by vertical positioning pins 38 received in recesses in housings 36 and engaging a slot 40 in one of flanges 26 to hold ramp 20 in properly aligned position. The alignment and locking pin 38 are held in place by a threaded plug 42, as shown.

Sear ramp 20 is held in place in a first position against longitudinal movement along sleeve 18 by a force-releasable securing means such as a shear pin 44 which extends through one of housings 36 and into a seating opening in flange 26 of sear ramp 20. Upon catapulting the rocket the resilient pendant will be pulled taut between the object to be towed and the rocket and due to its resiliency will be stretched between the object to be towed and the sear ramp 20 held against longitudinal rearward movement by shear pin 44 with the result that energy will be stored up in the resilient pendant causing a restoring force to be exerted on it. The shear pin will be fractured when sufficient force has been applied to it to permit the restoring force in the pendant to take effect with the result that sear ramp 20 will be snapped rearwardly along sleeve 18 with great force by a snap action before the pendant moves the object to be towed. Conveniently, the shear pin or other securing means is structured to break or release upon the application of a force of about 800 pounds. Other force-releasable securing means than the shear pin may be used, such as, a tie bolt which fractures in tension, a notched detent, an over-center toggle, or other similar mechanism.

As the ramp 20 snaps rearwardly to its second position its camming surface 24 strikes a pair of ignition actuation means, such as, laterally slidable bolts or firing pin sears 48 which are mounted, respectively, in housings 36.

Conveniently, each sear has a cam surface 50 which is struck by the conical surface 24 of ramp 20 driving each sear outwardly and perpendicularly from the longitudinal axis of rocket R so that a second firing pin cam surface 52 of each sear strikes firing pins 54, respectively, which in turn causes the firing pins to strike their respective percussion caps 58 which simultaneously ignites charges 60. It will be apparent that the elasticity of the pendant resulting in the stored-up restoring force replaces the conventional springs used to impart energy to firing pins. The elasticity of the pendant also prevents damage to the towed object as it is pulled forward from its stationary position. Charges 60 then ignite a base or booster charge 62 which in turn ignites propellant 64 within rocket R. The gases from propellant 64 pass upwardly through central opening 66 and are discharged through rearwardly facing nozzles, such as nozzle 68 shown in FIG. 2, causing the rocket to exert thrust. Other ignition means than percussion primers may be used, such as, electrical ignition devices, stab detonators and similar devices.

The rocket actuation device of the invention described above operates similarly to actuate rockets for any desired purpose.

As best seen in FIGS. 4 and 5, modification includes attachment of a safety ring S to base B of rocket R during shipment and storage to insure that sears 48 cannot be driven outwardly so as to cause firing pins 54 to strike percussion caps 58. Conveniently, the safety ring is provided with a pair of inwardly directed flanges 70 and 72, as seen in FIG. 5, and flange 70 is provided with oppositely-spaced recesses 74 so that safety ring S when properly oriented can be slipped over housings 36 and then rotated to the position shown in FIG. 4. Conveniently, the safety ring is held in this position against rotation in one direction by a locking pin 76 which extends transversely through flanges 70 and 72, as shown. Locking pin 76 is connected by means of a ring 78 and a separable connector 80 to an anchor pin 82 which also extends through flanges 70 and 72 on the opposite side of housings 36 so that the locking ring cannot be rotated in the opposite direction with respect to base B. Conveniently, connector 80 is of such a length that locking pin 76 cannot be removed from the hole until the connector is separated. The connector may include one or more couplings 84 which can be provided with internal threads engaging external threads on the coupling and either connected to ring 78 or anchor pin 82 so that the ring 78 may be disconnected from anchor pin 82 and the locking pin 76 withdrawn when safety ring S is to be removed for installation of the rocket in an aircraft.

It is to be noted that the assembly of the pendant end, sleeve and sear ramp can be inserted into the recess 30 of the rocket base and locked therein or removed therefrom with the safety ring assembled on the rocket base.

From the foregoing, the advantages of this invention are readily apparent. A means of connecting a pendant to a rocket has been provided which includes an interlock that prevents rotation of the connector with respect to the base of the rocket. In addition, a firing mechanism has been provided wherein sliding bolts or sears are arranged for movement perpendicular to the axis of the rocket and, therefore, require a minimum amount of space, making it possible to keep the length of the rocket at a minimum. In addition, the firing mechanism is of simple construction yet highly efficient in operation. Finally, a safety ring is provided for use on the base of the rocket during shipment and storage, which will prevent outward movement of the sears so that accidental firing of the rocket will be avoided.

The invention has been described in detail with particular reference to a preferred embodiment thereof, but it will be understood that variations and modification can be effected within the spirit and scope of the invention. Two sears and associated ignition devices have been illustrated and described as a redundancy feature; however, the invention is not limited to the use of two sears as one or more may be used.

While the invention has been illustrated by its application to the ignition of a tractor rocket for pulling an object from an aircraft, it is not limited to this illustrative embodiment as it can be used for the ignition of rockets for any purpose.

What is claimed is:

1. Apparatus including ignition means for igniting a rocket of the tractor type wherein the rocket, having an elastic pendant having one end attached to the base of the rocket and the other end attached to the towed object, is catapulted so that the force exerted by the pendant after being pulled taut between the rocket and the towed object activates the rocket to pull the tow line, said apparatus comprising:
    camming means surrounding the one end of the pendant and movable thereby longitudinally of the rocket from a first position to a second position;
    force releasable securing means connecting the base of the rocket and said camming means to hold said camming means in its first position until a force is exerted upon said pendant of sufficient magnitude to release said securing means and permit said camming means to move from its first position to its second position;
    at least one ignition actuation means mounted for lateral movement between a first position and a second position along an axis extending perpendicular to the longitudinal axis of said rocket and in the base thereof, said ignition actuating means being engagable by said camming means for movement of said ignition actuating means by camming action from its first position in a direction away from said camming means toward the ignition means for said rocket to its second position upon movement of said camming means from its first position to its second position; and
    ignition means for said rocket located laterally outward from said camming means moved by movement of said ignition actuating means from its first position to its second position to ignite said rocket.

2. Apparatus as claimed in claim 1, including:
    a second ignition actuating means mounted for movement perpendicular to the longitudinal axis of said rocket in opposite direction to that of the first ignition actuating means from a first position to a second position upon movement of said camming means from its first to its second position, and a second ignition means activated by movement of said second ignition actuating means from its first position to its second position to ignite said rocket.

3. Apparatus as claimed in claim 1, wherein said camming means is a sear ramp, and further including:
    means for releasably connecting the one end of the pendant and said sear ramp to the base of the rocket.

4. A rocket actuation device as claimed in claim 3, wherein the one end of the pendant is provided with a sleeve and said sear ramp includes:
    a conical body portion having a central opening therethrough for receiving the one end of said pendant;
    a generally rectangular base surface, with arcuate end portions joined by parallel sides, upon which said sleeve rests;
    arcuate flanges extending upwardly from the arcuate ends of said base for engaging opposite sides of said sleeve; and wherein the base of the rocket includes:
    oppositely extending housings extending along the axis of said sears and enclosing the same, said housings being spaced apart at the center portion of the base with arcuate flanges transverse to the arcuate end portions of said housings so that said sear ramp and sleeve can be inserted between said housings and then rotated so that the ends of said rectangular base surface extend under the ends of said housing; and
    a notch in one end of said sear ramp alignable with a passageway in said housing for receiving a spline for locking said sear ramp in proper orientation with respect to said housing.

5. Apparatus as claimed in claim 3 wherein said ignition means includes a firing pin, said releasable means is a shear pin, and said ignition actuating means is a sear, said sear including:
    a first cam surface at one end thereof engagable by said sear ramp when said shear pin fractures to force said sear outwardly along said axis; and said sear further includes:
    a second cam surface strikable against the firing pin to cause ignition of the rocket.

6. Apparatus as claimed in claim 1 further including;
    a safety ring detachably connectable to the base of the rocket over the outer end of said sear to prevent outward movement of said sear to prevent inadvertent ignition of the rocket; and
    lock means for holding said safety ring in position on the base of said rocket.

7. A rocket actuation device, as claimed in claim 6, wherein said safety ring further includes;
    an outer circular rim sized to fit over the base of said rocket;
    a pair of spaced parallel flanges extending inwardly from opposite sides of said rim; and
    a pair of oppositely spaced notches in one of said flanges so that said safety ring can be positioned over said housings and then rotated to bring the ends of said housings under said flanges.

8. A rocket actuation device as claimed in claim 7, wherein said lock means of said safety ring further includes;
    a pair of spaced openings in each of said flanges;
    a locking pin slidably received through one of said pairs of openings to prevent rotation of the locking ring in one direction;

an anchor pin in the other pair of said openings to present rotation of said safety ring in the opposite direction; and coupling means connecting said locking pin and said anchor pin to prevent accidental removal of said locking pin.

9. A rocket actuation device for a rocket of the type for extracting an occupant of a disabled aircraft therefrom wherein the rocket, having a pendant having one end attached to the base of the rocket and the other end attached to the occupant, is launched from the aircraft so that the force exerted by the pendant after being pulled taut between the rocket and the occupant activates the rocket to pull the occupant from the aircraft, said actuation device comprising;

a pair of oppositely positioned housings on said base of said rocket spaced from the center thereof and extending outwardly toward the side edges, said housings having arcuate curved inner edges in spaced opposing relationship;

a sleeve on the end of said pendant extending downwardly from the end thereof and then offset inwardly to form a circular flange;

a sear ramp having a conical body portion with a central opening therethrough through which the end of said pendant and said sleeve extend and having an upwardly facing generally rectangular surface forming a support for said flange of said sleeve, said surface having generally parallel side edges and arcuate end edges which terminate in upwardly extending arcuate flanges adjacent opposite sides of said sleeve near said offset portion, said sear ramp being positionable transversely to said housings so that said side edges of said ramp can be inserted past the arcuate end edges of said housing and then the sear ramp can be rotated to bring the arcuate ends thereof under the arcuate ends of said housing;

a notch in one end of said sear ramp alignable with a passageway through one of said housings;

an alignment pin extendable through said passageway and said notch to maintain said sear ramp in proper orientation with respect to said housing;

a shear pin extending through a portion of said housing and said sear ramp to hold said sear ramp in a first position, said sear ramp being movable from said first position to a second position when a force is exerted upon said pendant upon launching of said rocket from said aircraft sufficient to fracture said shear pin causing said sear ramp to be jerked longitudinally of the rocket to said second position;

a sear in each of said housings movable laterally and outwardly with respect to said rocket from a first position to a second position, and having a first cam surface engagable by said sear ramp when said sear ramp is moved from its first position to its second position to move said sears from their first positions to their second positions, each of said sears having a second cam surface; and ignition means mounted in each of said housings and including a firing pin which is strikable by said second cam surfaces of each of said sears upon movement of said sears from said first position to said second position to ignite said rocket so that acceleration thereof pulls said occupant of said aircraft from said aircraft.

10. Rocket ignition apparatus constructed to occupy minimum housing space including an assembly of elements for attachment to the base of a rocket comprising:

a principal actuating means mounted to move in a first plane in said assembly;

camming means movable by said principal actuating means in said first plane from a first position to a second position;

at least one ignition actuating means mounted for movement in a second plane substantially perpendicular to said first plane between a first position and a second position, said ignition actuating means being engageable by said camming means for movement of said ignition actuating means from said first position to said second position upon movement of said camming means from its first position to its second position, at least one ignition means activated by movement of said ignition actuating means from said first position to said second position to cause ignition of the propellant of said rocket, force releasable securing means adapted to releasably hold said camming means on said rocket base in said first position until a force is exerted upon said principal actuating means of sufficient magnitude to move it to release said securing means and to move said camming means from said first position to said second position, said principal actuating means being an elastic pendant movably attached by one end to said assembly with its other end adapted for attachment to an object to be towed by the rocket, whereby energy stored in said elastic pendant when it is stretched between said rocket and said object upon firing of said rocket is released upon release of said force releasable securing means to move said camming means rapidly to its second position to cause ignition of said rocket propellant with said stored-up energy serving the function of springs ordinarily used to impart energy to a firing pin.

11. The apparatus of claim 10 in which said force releasable camming means is a sear ramp, said force releasable securing means is a shear pin, said ignition actuating means is a sear and said ignition means is a firing pin.

* * * * *